United States Patent
Stone et al.

(10) Patent No.: US 6,639,739 B1
(45) Date of Patent: Oct. 28, 2003

(54) OPTIC FOR AN ENDOSCOPE/BORESCOPE HAVING HIGH RESOLUTION AND NARROW FIELD OF VIEW

(75) Inventors: Gary F. Stone, Livermore, CA (US); James E. Trebes, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/236,298

(22) Filed: Sep. 4, 2002

(51) Int. Cl.[7] ................................................. G02B 9/04
(52) U.S. Cl. ........................ 359/793; 359/435; 359/717
(58) Field of Search ............................... 359/793–795, 359/362, 435, 646, 717, 434

(56) References Cited

U.S. PATENT DOCUMENTS

| | | | | |
|---|---|---|---|---|
| 3,807,836 A | * | 4/1974 | Baker | 359/775 |
| 5,327,283 A | * | 7/1994 | Zobel | 359/434 |
| 5,359,453 A | | 10/1994 | Ning | 359/435 |
| 5,416,634 A | | 5/1995 | Ning | 359/435 |
| 5,666,222 A | | 9/1997 | Ning | 359/435 |
| 5,892,630 A | * | 4/1999 | Broome | 359/834 |
| 5,900,971 A | | 5/1999 | Ning | 359/435 |
| 6,515,809 B2 | * | 2/2003 | Kohno | 359/793 |

FOREIGN PATENT DOCUMENTS

| | | |
|---|---|---|
| EP | 0587177 A1 | 3/1994 |
| WO | WO 93/00766 A1 | 1/1993 |
| WO | WO 93/17362 A1 | 9/1993 |

\* cited by examiner

*Primary Examiner*—Scott J. Sugarman
*Assistant Examiner*—M. Hasan
(74) *Attorney, Agent, or Firm*—Michael C. Staggs; Alan H. Thompson

(57) ABSTRACT

An optic having optimized high spatial resolution, minimal nonlinear magnification distortion while at the same time having a limited chromatic focal shift or chromatic aberrations. The optic located at the distal end of an endoscopic inspection tool permits a high resolution, narrow field of view image for medical diagnostic applications, compared to conventional optics for endoscopic instruments which provide a wide field of view, low resolution image. The image coverage is over a narrow (<20 degrees) field of view with very low optical distortion (<5% pin cushion or barrel distortion. The optic is also optimized for best color correction as well as to aid medical diagnostics.

18 Claims, 2 Drawing Sheets

OPTIC FOR AN ENDOSCOPE/BORESCOPE HAVING HIGH RESOLUTION AND NARROW FIELD OF VIEW

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to an endoscopic inspection tool, particularly to the imaging optics at the distal end of an endoscopic inspection tool, and more particularly to an optic for such a tool which permits high resolution, narrow field of view image, particularly for medical diagnostic applications, such as for inspection of the interior of human biology, and which is optimized for best color fidelity.

In the medical fields, endoscopic inspection tools are generally of a survey nature, i.e., the optical designs of the distal (primary image forming optics) utilize graded index lenses with wide (<50 degree) field of view and long depth (<2 mm) of field of view. These optic designs provide the medical clinician with excellent overall view of the medical problem being diagnosed. These prior designs also suffer from significant optical distortion and image field curvature.

This makes determination of feature size, geometry and relative spatial displacement very problematic. In the case where a close-up, undistorted view of a sample is required, a biopsy is performed and the pathology inspected outside the body. The act of cutting can change the pathology and make accurate diagnosis difficult. Thus, in-sites imaging is the preferred method for rapid and accurate testing.

The optic of the present invention gives the operator a narrow (<20 degrees), undistorted (<5%) image of the sample. The optic of this invention provides a tool for past-survey diagnostic identification and characterization. The optic provides a clear, undistorted view of the pathology and thus enables effective treatment. Such features as pre-teen endometrial scarring and tissue abnormalities is one area where the optic of this invention would make a significant improvement to currently available instruments.

SUMMARY OF THE INVENTION

It is an object of the present invention to provide an imaging optics for an endoscopic inspection tool.

A further object of the invention is to provide an optic having a high resolution and narrow field of view.

A further object of the invention is to provide an optic that is optimized for color correction.

Another object of the invention is to provide an optic at the distal end of an endoscopic tool to enable image coverage over a narrow (<20 degrees) field of view with very low optical distortion (<5%) and high resolution (<100 microns) image, as well as a short working distance (<2 mm).

Other objects and advantages of the present invention will become apparent from the following description and accompanying drawings. The invention involves an optic for use at the distal end of a endoscopic tool, for example, which is optimized for high spatial resolution, minimal nonlinear magnification distortion (pin cushion/barrel optical distortion) while at the same time having a limited focal shift or chromatic aberrations. The optic has been designed with a narrow field of view (<20 degrees) and a short working distance (<2 mm), and optimized for an undistorted (<5%), high resolution (<100 microns) image of the sample. This optic unables the production of high fidelity color representations of the objects imaged and to reduce the depth of field to discriminate the tissue being inspected. The use of this optic to visually identify the type, color and scale of the sample taken would greatly aid in this diagnosis.

BRIEF DESCRIPTION OF THE DRAWINGS

The accompanying drawings which are incorporated into and form a part of the disclosure, illustrate embodiments of the invention and, together with the description, serve to explain the principles of the invention.

DETAILED DESCRIPTION OF THE INVENTION

Figure 1:
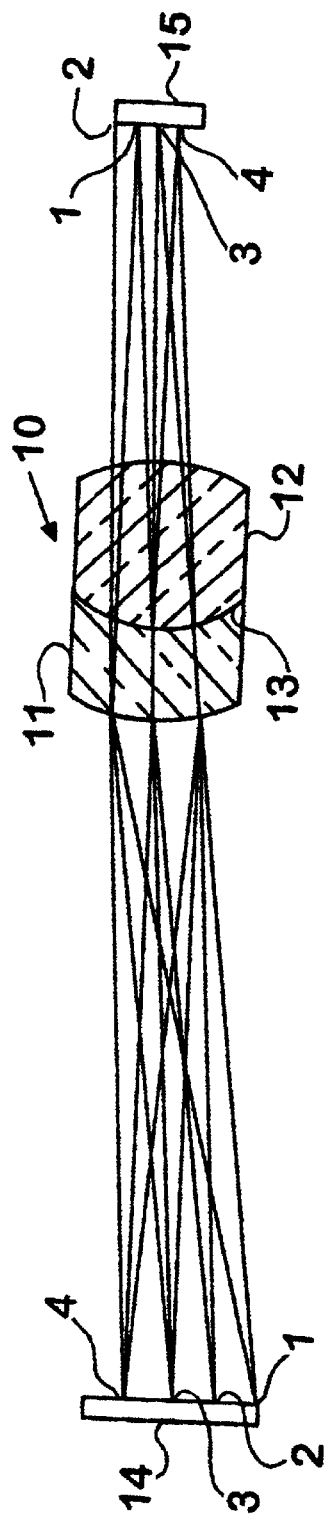
FIG. 1 is a cross-sectional side view of an embodiment of the optic of the invention mounted in an optic layout.

The present invention is directed to an optic for the imaging optics at the distal end of an endoscopic inspection tool. The optic of this invention permits a high resolution, narrow field of view image for application such as medical diagnostics. The present invention provides a significant advance over optics of conventional design for endoscopic instrument which generally provide a wide (<50 degrees) field of view, and long (<2 mm) depth of field. The optic of this invention has a narrow (<20 degrees) field of view with very low (<5%) optical distortion, a short (<2 mm) working distance, and a high (<100 microns) resolution of the sample.

The main purpose of this optic is for inspection of the interior of human biology. It also has industrial application where low distortion, high resolution, narrow field of view, and good color fidelity are required. The optic as particular application to improve the visualization and of endometrial lesions inspection in young women, where the small size is below current endoscopic tools. The optic also provides a tool to image at high resolution, very low optical distortion and fairly accurate color fidelity within a narrow field of view.

The optic of the invention provides a small image field with high resolution to permit clinicians the ability to view biological structures below 50 $\mu$m spatial scale size and to identify the colors and relative scale sizes of those areas against healthy tissues. The solution of the optic is <5$\mu$ at the edge of the optical field. With a narrow field of view (FOV), the clinician must know the area to be inspected prior to the exam. This visualization tool or optic is designed to perform high resolution identification of abnormal tissue structures.

The optic of this invention allows conventional imaging with very low optical distortion—<0.5%—when compared to the majority of distal endoscope optics that are based on gradient index or GRIN's lens designs that have significant distortion—typically <2%. The low distortion was selected as a major requirement for the medical inspection as an undistorted image would allow the accurate mapping of the relative spatial size and displacement of features across the image field.

The filed of view for this optic is narrow when compared to conventional distal imaging optics found on small endoscopes. The total viewing angle for this optic is 10 degrees for the full field of view of 10 degrees. GRIN's lens systems generally are from 40–70 degrees full angle FOV. The main use of this system is for specific metrology of surfaces rather than a survey tool as are nearly all small endoscopes.

The optic of this invention is a cemented doublet of two different glass types so that colors are imaged at a common optical plane with limited chromatic focal shift and limited lateral color shift as well. The doublet is designed to correct the color representation across the visible (450–650 nm) with low later color dispersion (<1µ at the edge of the 5 degree FOV) and a narrow chromatic focal shift of <17 µm. The doublet illustrated in FIG. 1 is 0.5 mm in diameter and 1.5 mm in length, but the diameter can range from 0.3 mm to 1.0 mm, and the length range from 0.75 mm to 2.5 mm.

The optic is optimized for a given working distance and magnification at the sample plane, the working distance being exemplified as <2 mm, but may range from 1.5 mm to 5 mm. The optic is optimized to produce high fidelity color representation of the objects imaged and to reduce the depth of field to discriminate the tissue being inspected. By limiting the field of view and restricting the depth of field of the optic, images of improved imaged content can be presented to the clinician. Designed for specific angular fields of view and for specific working distance, the optic can be tailored to select jobs as required. When a lesson overall size or specific cellular defect is suspected, the correct optic for that job can be developed.

Referring now to the drawings, FIG. 1 is a cross-sectional side view of an embodiment of a cemented doublet of two different glass types, with the optic being indicated at 10 and the two glass members indicated at 11 and 12 which are cemented together allowing a line 13. The two different type glass members 11 and 12 are selected so that color are imaged at a common optical plane with limited chromatic focal shift and limited lateral color shift. The optic 10, as shown in FIG. 1 is located intermediate an object or sample 14 and an image plate 15. Four (4) light segments 1, 2, 3 and 4 are directed onto the object 14 and reflected back through the optic 10 and contact the image plate 15 in a 180° relation. The colors of the light segments 1–4 may be, for example, as seen on the object 14 yellow, red, green, and blue, with these colors being reversed or rotated 180° when seen on image plate 15 as light segments 1(yellow), 2(red), 3(green) and 4(blue).

Figure 2:
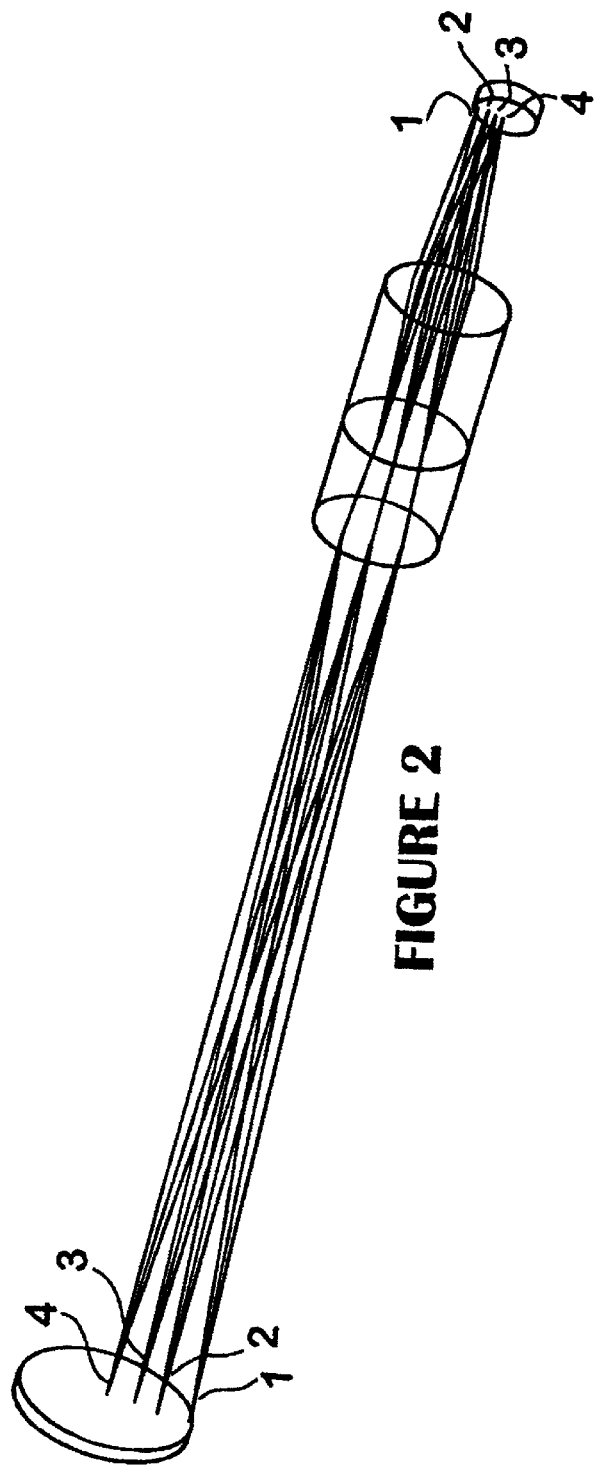
FIG. 2 is a 3D optical layout incorporating an optic made in accordance with the present invention.

FIG. 2 illustrates a 3D embodiment of the optic of the invention generally indicated at 20, composed of glass member 21 and 22 cemented together at 23, and with optic 20 mounted intermediate an object or sample 24 and an image plate 25, with the light segments 1–4 being illustrated as described above relative to FIG. 1.

It has thus been shown that the present invention provides a high resolution, narrow field of view optic particularly adapted for medical diagnostic applications. The specific design of the optic is for diagnostic imaging where high resolution of an undistorted image is required. The design of the optic is also optimized for best color correction as well as to aid medical diagnostics. Also, in an industrial setting, this optic also has merit as an inspection tool where high resolution and low optical distortion produced by graded optics are not desirable.

For example, this optic is designed to give the operator (medical clinician) a narrow (<20 degrees), undistorted (<5%) image of a sample (tissue). This optic is a tool for post-survey diagnostic identification and characterization, and provides a clear, undistorted view of the pathology, thereby enabling effective treatment. Such features are preteen endometrial scarring and tissue abnormalities would be one area where this optic would make a significant improvement to currently available instruments.

Figure 3:
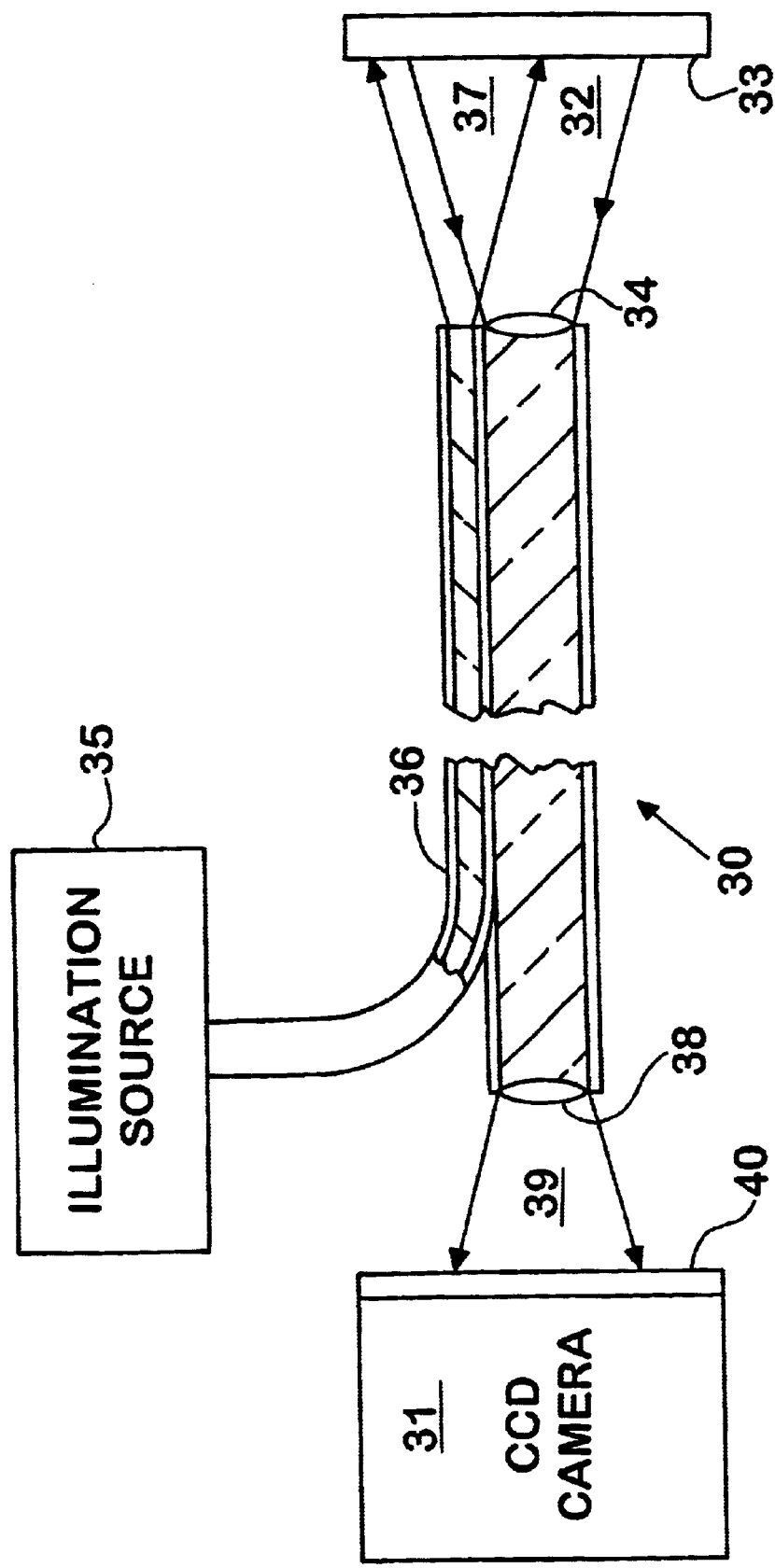
FIG. 3 illustrates, partially in cross-section, a fiberoptic endoscopic inspection tool with a camera as the viewing port detector, and which incorporates the optic of the present invention.

FIG. 3 illustrates a commercial fiberoptic endoscope inspection tool generally indicated at 30 with a camera 31 as the viewing port detector. The endoscope tool 30 includes an image cone 32 positioned adjacent an object, surface, or sample 33, and includes an optic 34 at the distal end, which may be the optic of FIGS. 1 and 2. An illuminator 35 is connected via a single mode optical fiber 36 to a fiber illumination cone 37. An image plate 38 is mounted at the opposite end of endoscope tool 30 and the image 39 from the surface or object 33 is directed onto transited image planes 40 to the CCD camera 31.

As described above, FIG. 3 illustrates a commercial fiberoptic endoscopic inspection tool with a camera as the viewing port detector. The camera image is relayed into a portable computer with a video frame capture capability. The portable computer has software to control the camera and perform the necessary documentation and image processing work to collect and determine the sample conditions (surface roughness and visual evidence of contamination). Computer software would determine the proper image planes based upon test sample coupons inspected and stored before the test began. An inspection procedure would begin by the operator inserting the endoscopic inspection instrument into the access port of.the device and locating the component parats to be viewed and measured. The computer would modulate the focal plane of the detector and collect images at predetermined places based upon the instrument optical calibration. The image plane modulation would be performed by real-time image processing to measure the change in processed signal of a line or series of lines across the sample. The change of focus of the image plane will be electric motor driven or pneumatically actuated with a feed back mechanism to trigger the TV camera frames at the precise positions. Lighting and lens parameters would be pre-determined on test samples imaged just prior to the test data collection. Any changes in the optical instruments performance could be compensated in the field. The images of the in-focus and de-focused data would be stored on the computer for off-line processing. The operator, would collect a series of images and the data processed by the computer giving a near real time determination of the quality or safety of a part in question. Removing the subjective determination by the human operator is one of the key aspects of this new inspection process.

Likewise, the inspection of stains or discoloration as a method to identify potential contaminants is also possible with this system. In this case, instead of focal position changes as the method to discriminate between good and bad surfaces, optical colorimetry will be used to measure defects. The imager used for this technique will be one that records a full color image of the sample. A lighting system capable of producing a spectral distribution matched to the detector CCD chip will be used. Software on the camera and in the portable computer will balance the response of the camera against the spectral output of the camera to produce a color balanced output image. The color separation filters in the imager head will be chosen to collect spectrally selective information about the surface in wavelength bands with minimal overlap. The photometric data produced by the inspection of test coupons just prior to the image collection of the data samples will be stored on the portable computer. The operator will collect test data and the computer will off-line process these images to determine those with suspected contamination.

While certain embodiments, parameters, etc., have been described and/or illustrated to exemplify and teach the principles of the invention, such are not intended to be limiting. Modifications and changes may become apparent to those skilled in the art, and it is intended that the invention be limited only by the scope of the appended claims.

What is claimed is:

1. In an inspection tool utilizing an optic at a distal end, the improvement comprising:

said optic being a doublet comprising two different glass types cemented together wherein said doublet is constructed to image colors at a common optical plane with limited chromatic focal shift and limited lateral color shift.

2. The improvement of claim 1, wherein said doublet is constructed to correct color representation across the visible (450–650 nm) with lateral color dispersion of $<1\mu$ at an edge of a 5 degree field of view and a chromatic focal shift of $<17$ $\mu$m.

3. The improvement of claim 1, wherein said doublet has an optical distortion of $<0.5\%$.

4. The improvement of claim 1, wherein said doublet has a resolution of $<5\mu$ at an edge of an optical field.

5. The improvement of claim 1, wherein said doublet has a $<20$ degrees field of view and an optical distortion of $<5\%$.

6. The improvement of claim 1, wherein said doublet has a field of view of $<20$ degrees, a working distance of $<2$ mm.

7. The improvement of claim 6, wherein said doublet is optimized for an undistorted ($<5\%$), high resolution ($<100$ microns) image of an associated sample.

8. The improvement of claim 1, wherein said doublet has a total viewing angle of 10 degrees for a full field of view of 10 degrees.

9. A high resolution, narrow field of view optic, comprising:

a doublet having a narrow ($<20$ degrees) field of view with low optical distortion ($<5\%$ pin cushion or barrel distortion).

10. The optic of claim 9, wherein said doublet is composed of two cemented together glass members.

11. The optic of claim 10, wherein said two cemented together glass members comprise of different glass types.

12. The optic of claim 11, wherein said different glass type are cemented together such that colors are imaged at a common optical plane with limited chromatic focal shift and limited lateral color shift.

13. The optic of claim 12, wherein said doublet is constructed to correct the color representation across a 450–650 nm light band.

14. The optic of claim 13, wherein said doublet is constructed to have a lateral color dispersion of $<1\mu$ at an edge of a 5 degree field of view.

15. The optic of claim 14, wherein said doublet is constructed to have a chromatic focal shift of $<17$ $\mu$m.

16. The optic of claim 15, wherein said doublet has a viewing angle of 10 degrees for a full field of view of 10 degrees.

17. A method for fabricating an optic having a field of view of $<20$ degrees and an optical distortion of $>5\%$, with resolution of $<100$ microns, and a working distance of $<2$ mm, comprising:

providing two glass members comprising different glass types, and cementing the glass member together to form a doublet such that colors are imaged at a common optical plane with limited chromatic focal shift and limited lateral color shift.

18. The method of claim 17, additionally including designing the doublet to correct color representation across the visible (450–650 nm) with a lateral color dispersion of $<1\mu$ at an edge of a 5 degree field of view and a chromatic focal shift of $<1$ $\mu$m.

* * * * *